US012158091B2

(12) United States Patent
Kono et al.

(10) Patent No.: US 12,158,091 B2
(45) Date of Patent: Dec. 3, 2024

(54) V-TYPE ENGINE, OUTBOARD MOTOR, AND WATERCRAFT

(71) Applicant: HONDA MOTOR CO., LTD., Tokyo (JP)

(72) Inventors: Shohei Kono, Wako (JP); Hirosuke Niwa, Wako (JP); Hayate Araki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/550,211

(22) PCT Filed: Mar. 19, 2021

(86) PCT No.: PCT/JP2021/011552

§ 371 (c)(1),
(2) Date: Sep. 12, 2023

(87) PCT Pub. No.: WO2022/195896

PCT Pub. Date: Sep. 22, 2022

(65) Prior Publication Data

US 2024/0191648 A1 Jun. 13, 2024

(51) Int. Cl.

| | |
|---|---|
| ***F01N 13/00*** | (2010.01) |
| ***B63H 20/24*** | (2006.01) |
| ***B63H 20/28*** | (2006.01) |
| ***F01N 3/20*** | (2006.01) |
| ***F01P 3/20*** | (2006.01) |
| *F01N 3/10* | (2006.01) |

(Continued)

(52) U.S. Cl.

CPC ........... *F01N 13/004* (2013.01); *B63H 20/24* (2013.01); *B63H 20/28* (2013.01); *F01N 3/2046* (2013.01);

(Continued)

(58) Field of Classification Search

CPC ...... F01N 3/101; F01N 3/2046; F01N 13/004; F01N 13/107; F01N 13/1805;

(Continued)

(56) References Cited

U.S. PATENT DOCUMENTS 5,494,467 A * 2/1996 Sohgawa ............. B63H 20/245 440/89 R
9,359,058 B1 * 6/2016 Langenfeld ............ B63H 20/24

(Continued)

FOREIGN PATENT DOCUMENTS

EP 2 163 739 A1 3/2010
JP 2001-303948 A 10/2001

(Continued)

OTHER PUBLICATIONS

International Search Report, International Application No. PCT/JP2021/011552, Date of mailing: Apr. 27, 2021, 2 pages.

(Continued)

*Primary Examiner* — Jorge L Leon, Jr.

(74) *Attorney, Agent, or Firm* — Rankin, Hill & Clark LLP

(57) ABSTRACT

A V-type engine in which exhaust pipe arrangement is easily performed and purification of exhaust gas can be performed by a single catalyst. Cylinders where pistons operate are arranged in a V-shape, a crankshaft driven by the driving of the pistons is disposed vertically, exhaust pipes communicating with exhaust openings in the respective banks of a cylinder head are included, rear exhaust pipes in the respective banks are merged outside on a side of the crankshaft, and a catalyst holder that holds a catalyst is provided in a merge portion of the rear exhaust pipes. Since the rear exhaust pipes in the respective banks are merged and the catalyst holder is provided in this merge portion, exhaust gas from each bank can be purified by the single catalyst, so that the number of catalysts installed is reduced to thus be able to reduce manufacturing cost.

6 Claims, 7 Drawing Sheets

(51) Int. Cl.

| | |
|---|---|
| *F01N 13/10* | (2010.01) |
| *F01N 13/18* | (2010.01) |
| *F01P 3/02* | (2006.01) |
| *F02B 75/22* | (2006.01) |

(52) U.S. Cl.
CPC ............... *F01P 3/202* (2013.01); *F01P 3/205* (2013.01); *F01N 3/101* (2013.01); *F01N 13/10* (2013.01); *F01N 13/107* (2013.01); *F01N 13/1805* (2013.01); *F01N 2260/024* (2013.01); *F01N 2590/021* (2013.01); *F01P 3/02* (2013.01); *F01P 2050/04* (2013.01); *F01P 2050/12* (2013.01); *F02B 75/22* (2013.01)

(58) Field of Classification Search
CPC ......... F01N 2260/024; F01N 2590/021; B63H 20/24; B63H 20/28; F01P 3/202; F01P 2050/04; F01P 2050/12; F02B 75/22
USPC ................................... 60/298, 299, 320, 323
See application file for complete search history.

(56) References Cited

U.S. PATENT DOCUMENTS

| | | | | |
|---|---|---|---|---|
| 9,365,275 | B1 * | 6/2016 | Habeck | F01N 13/004 |
| 9,903,251 | B1 * | 2/2018 | Belter | F01N 13/107 |
| 2001/0035155 | A1 | 11/2001 | Uegane et al. | |
| 2016/0129980 | A1 * | 5/2016 | Ochiai | F01N 3/10 440/88 M |
| 2016/0236763 | A1 * | 8/2016 | Achiwa | F01P 3/202 |
| 2016/0258335 | A1 * | 9/2016 | McKinney | F01N 13/107 |
| 2016/0273447 | A1 | 9/2016 | Nakayama | |
| 2018/0066555 | A1 * | 3/2018 | Langenfeld | F01N 3/046 |
| 2021/0380213 | A1 * | 12/2021 | Watanabe | F01P 7/14 |
| 2022/0126965 | A1 * | 4/2022 | Fukuda | F01N 3/2046 |
| 2022/0153399 | A1 * | 5/2022 | Fukuda | B63H 21/32 |
| 2022/0185440 | A1 * | 6/2022 | Ishizaka | F01N 13/12 |

FOREIGN PATENT DOCUMENTS

| | | | | |
|---|---|---|---|---|
| JP | 2016-173070 | A | 9/2016 | |
| WO | 2009/151138 | A1 | 12/2009 | |
| WO | WO-2020137748 | A1 * | 7/2020 | B63H 20/245 |
| WO | WO-2020166151 | A1 * | 8/2020 | B63H 21/32 |
| WO | WO-2020202668 | A1 * | 10/2020 | B63H 20/245 |

OTHER PUBLICATIONS

Written Opinion of the International Searching Authority dated Apr. 27, 2021 filed in PCT/JP2021/011552, 4 pages.
International Preliminary Report on Patentability dated Sep. 12, 2023, Application No. PCT/JP2021/011552; 6 pages.

* cited by examiner

V-TYPE ENGINE, OUTBOARD MOTOR, AND WATERCRAFT

TECHNICAL FIELD

The present invention relates to a V-type engine, an outboard motor, and a watercraft.

BACKGROUND ART

Conventionally, purification of engine exhaust gas has been an important issue, but in general-purpose machines requiring compact engine periphery, it is difficult to install equipment for such purpose in a finite space, and thus, there have been a few such implementation examples. However, on the back of recent increasing environmental concerns, research on installation of exhaust purification equipment in general-purpose machines has actively been conducted. In such a V-type engine, an exhaust device has conventionally been disclosed that includes an upstream portion of an exhaust passage, a first exhaust pipe, a second exhaust pipe, a third exhaust pipe, an exhaust chamber, a main exhaust passage, a first catalyst, and a second catalyst, the first catalyst being provided in a connecting portion between the first exhaust pipe and the second exhaust pipe, the second catalyst being provided in a connecting portion between the second exhaust pipe and the third exhaust pipe (see, for example, patent literature 1).

CITATION LIST

Patent Literature

[Patent Literature 1]
International Publication No. WO 2009/151138

SUMMARY OF INVENTION

Technical Problem

However, in prior art, since a catalyst is provided for each exhaust pipe, there is a problem in that the number of catalysts increases to thus increase the manufacturing cost. Further, when the engine is a V-type engine, it is necessary to provide the exhaust pipe for each bank, which makes it difficult to arrange the exhaust pipes as in prior art.

The present invention has been made in view of the aforementioned circumstances, and has an object to provide a V-type engine, an outboard motor, and a watercraft in which exhaust pipe arrangement is easily performed and purification of exhaust gas can be performed by a single catalyst.

Solution to Problem

In order to achieve the aforementioned object, a V-type engine according to the present invention, in which cylinders where pistons operate are arranged in a V-shape and a crankshaft driven by driving of the pistons is disposed vertically, includes exhaust pipes communicating with exhaust openings in respective banks of a cylinder head, in which the exhaust pipes in the respective banks are drawn toward a side of the crankshaft to be merged, and a catalyst holder that holds a catalyst is provided in a merge portion of the exhaust pipes.

Advantageous Effects of Invention

According to the present invention, since exhaust pipes in the respective banks are merged and a catalyst holder is provided in this merge portion, exhaust gas from each bank can be purified by a single catalyst, so that the number of catalysts installed is reduced to thus be able to reduce manufacturing cost.

DESCRIPTION OF EMBODIMENT

Hereinafter, an embodiment of the present invention will be described with reference to the drawings.

First Embodiment

First, a V-type engine used in an outboard motor of the present invention will be described with reference to FIG. 1 and FIG. 2.

Figure 1:
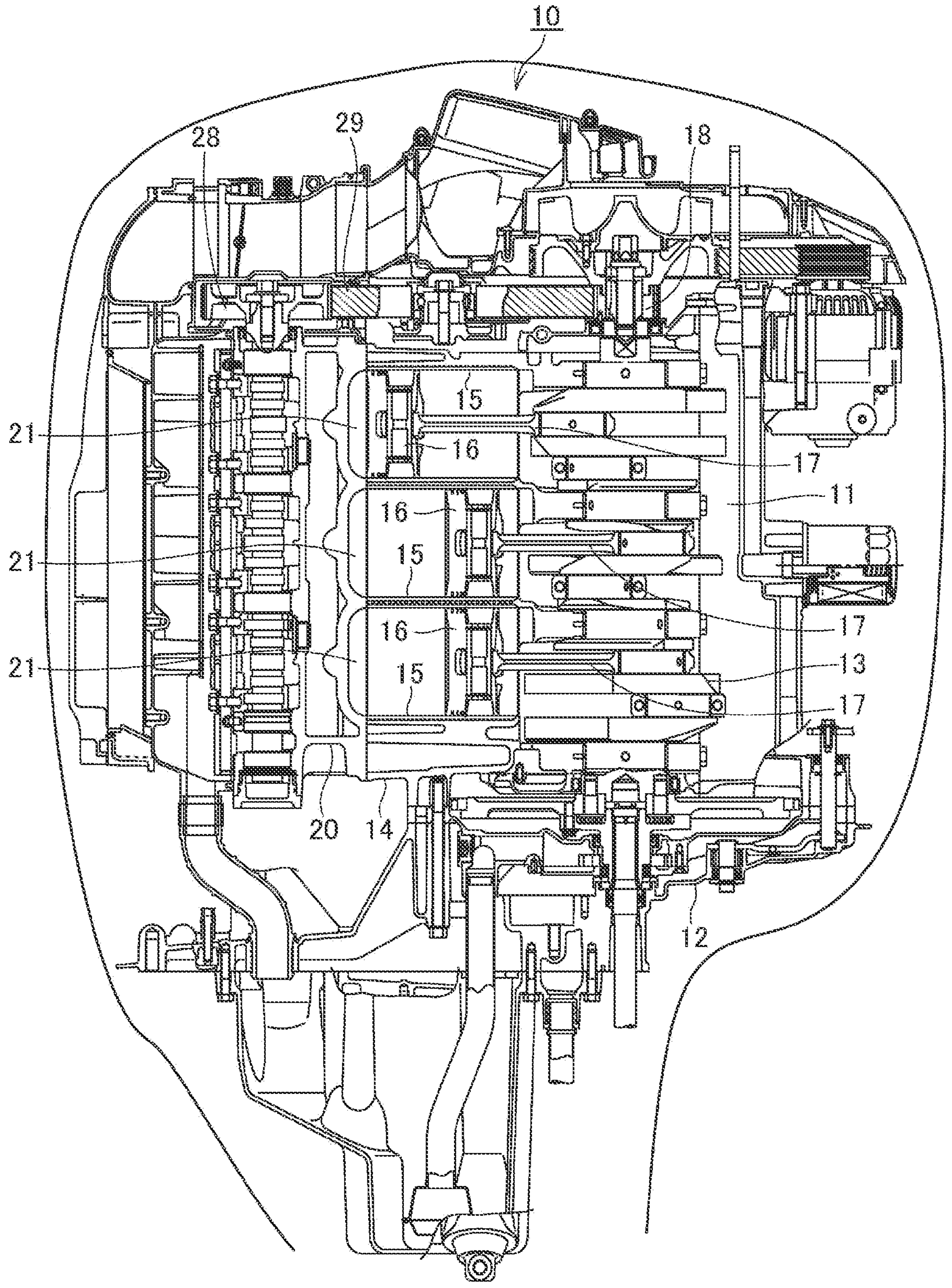
FIG. 1 is a longitudinal cross-sectional view illustrating an embodiment of a V-type engine used in an outboard motor according to the present invention.

FIG. 1 is a longitudinal cross-sectional view illustrating an embodiment of a V-type engine. FIG. 2 is a lateral cross-sectional view of the V-type engine of the present embodiment.

Figure 2:
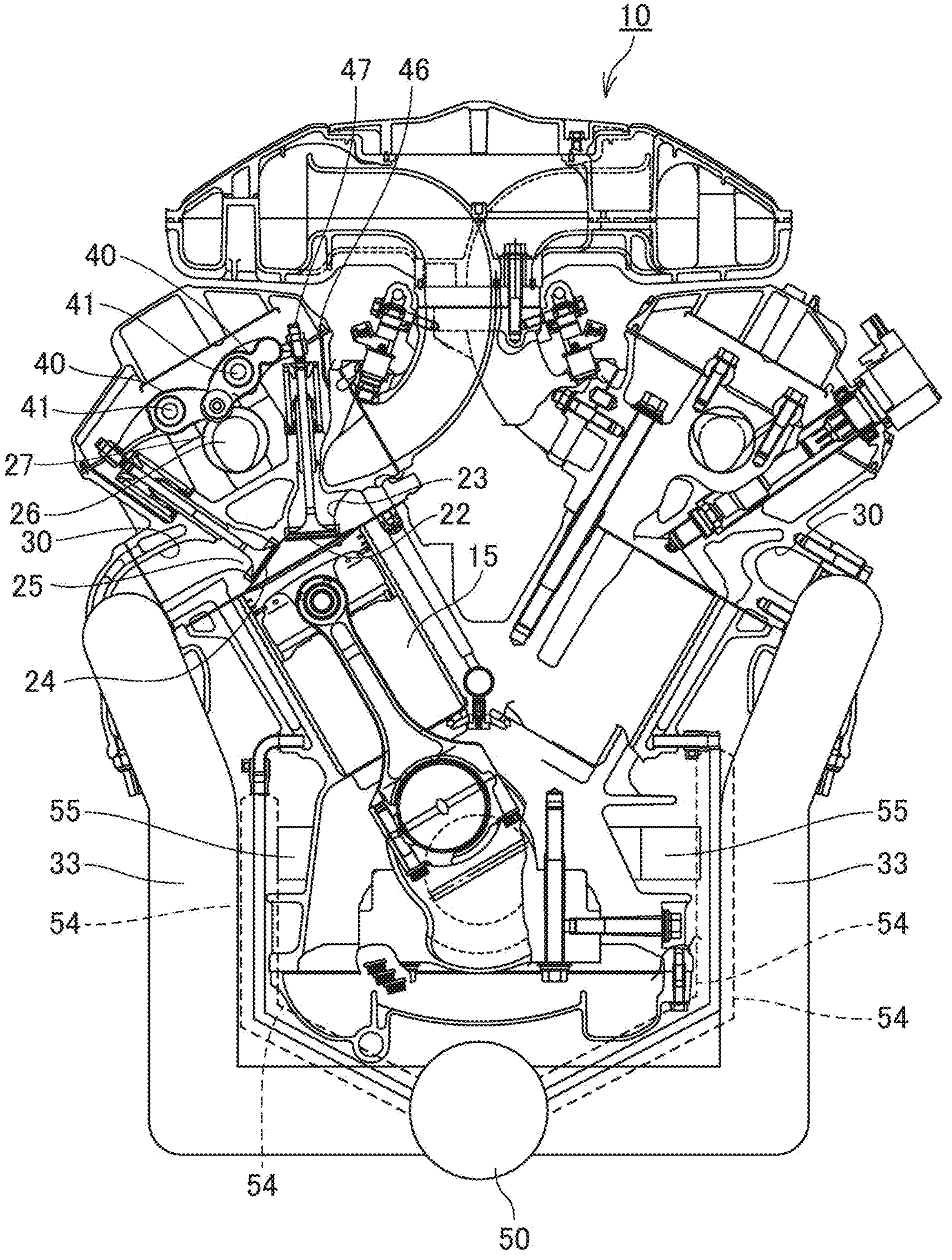
FIG. 2 is a lateral cross-sectional view of the V-type engine of a first embodiment.

As illustrated in FIG. 1 and FIG. 2, a V-type engine 10 of an outboard motor 1 is a V-type six-cylinder, water-cooled, four-stroke engine with three cylinders 15 arranged in a V-shape.

The V-type engine 10 includes a crankcase 12 that forms a crank chamber 11. A crankshaft 13 is rotatably supported in the crankcase 12.

In each cylinder 15 of a cylinder block 14, a piston 16 is housed reciprocatably and each piston 16 is coupled to the crankshaft 13 via a connecting rod 17.

The V-type engine 10 is housed in a casing 2 of the outboard motor 1. The crankshaft 13 is configured so as to be coupled to a screw via a driving power transmission mechanism (not shown), so that the screw can be rotationally driven by the rotation of the crankshaft 13.

A cylinder head 20 is provided, for each cylinder 15, with a combustion chamber 21 formed facing the piston 16, an intake port 23 that opens in the combustion chamber 21 and that is opened and closed by a pair of intake valves 22, and an exhaust port 25 that is opened and closed by a pair of exhaust valves 24.

The intake valves 22 and the exhaust valves 24 are driven to open and close by a cam 27 provided in a camshaft 26 that is rotatably pivotably supported in the cylinder head 20 and a rocker arm 40 that abuts on the cam 27.

The camshaft 26 is provided, in a right end portion, with a cam sprocket 28, and a timing belt 29 is stretched over between a drive sprocket 18 fitted near a right end portion of the crankshaft 13 and the cam sprocket 28.

In this manner, the intake valves 22 and the exhaust valves 24 are driven to open and close in synchronization with the rotation of the crankshaft 13.

Figure 3:
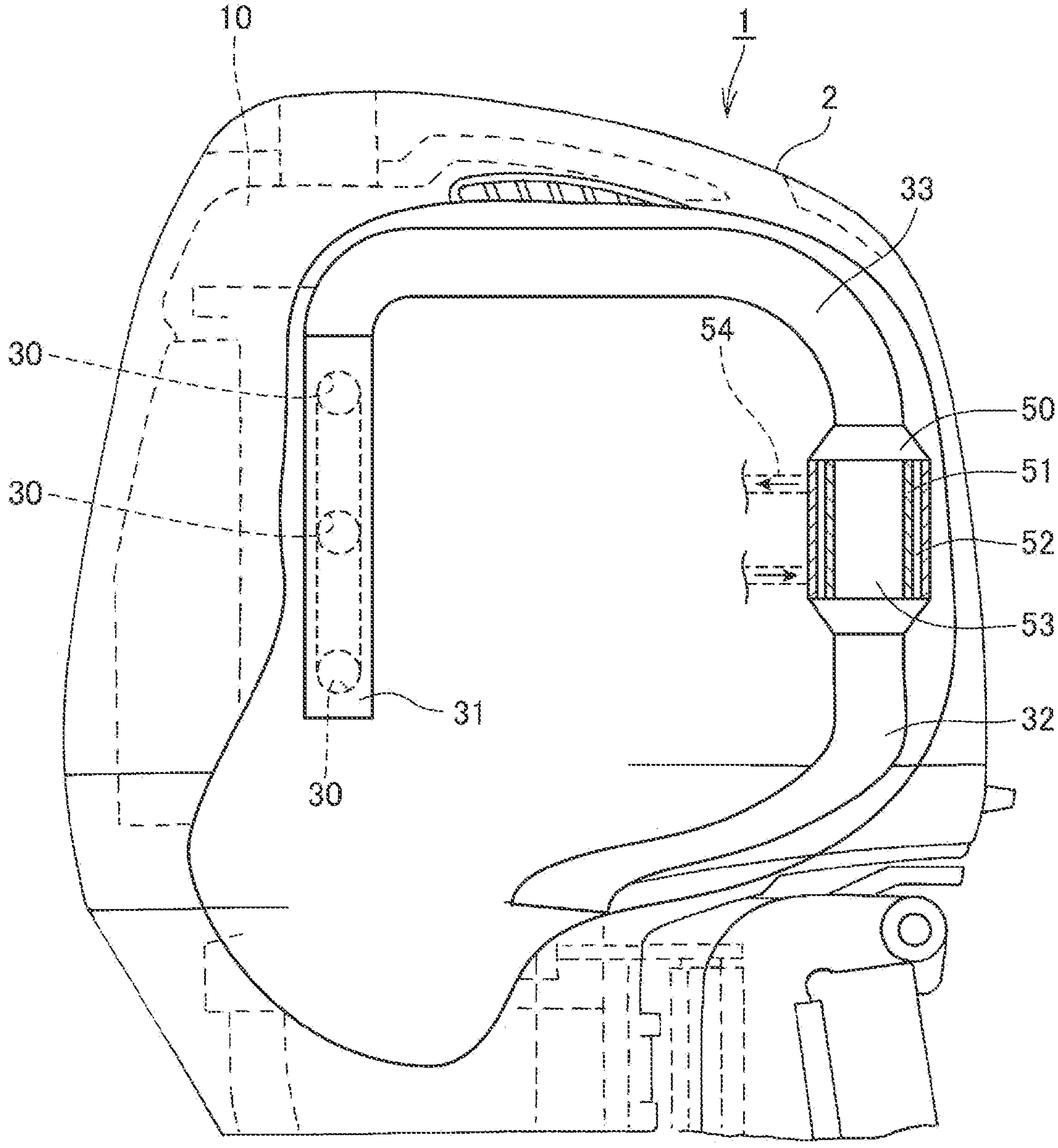
FIG. 3 is a schematic configurational view illustrating an exhaust structure of the first embodiment.
Figure 4:
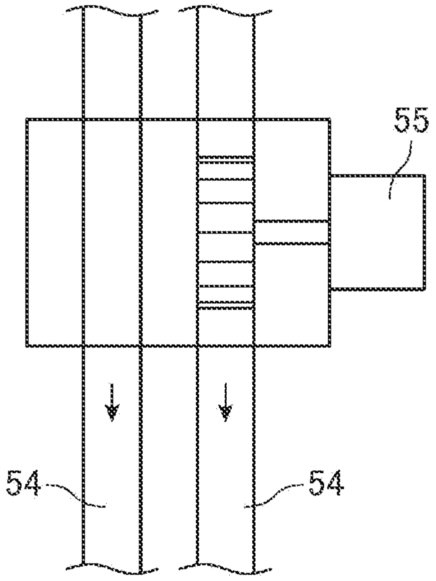
FIG. 4 is a schematic view of a portion of cooling water piping.

FIG. 3 is a schematic configurational view illustrating an exhaust structure of the V-type engine 10. FIG. 4 is a schematic view of a portion of cooling water piping.

As illustrated in FIG. 3, the V-type engine 10 is housed in the casing 2 of the outboard motor 1.

The V-type engine 10 includes upper exhaust pipes 31 each communicating with exhaust openings 30 of three cylinders in two banks in a V-shape. The exhaust pipes 31 are each arranged so as to extend in an up-down direction on the opposite sides of the V-type engine 10.

As illustrated in FIG. 3, a rear exhaust pipe 33 is connected to an upper end portion of each exhaust pipe 31.

The rear exhaust pipes 33 extend from upper portions of the exhaust openings 30 at the highest in the respective banks through upper portions of the cylinder block 14 and the crankcase and merge outside on the side of the crankshaft 13. By arranging the rear exhaust pipes 33, an unused space on an outer side of the banks of the V-type engine can be effectively used as an arrangement space for auxiliary equipment, a cable, or an exhaust pipe for a waterproof measure.

A catalyst holder 50 is connected to the merge portion of the rear exhaust pipes 33.

The catalyst holder 50 includes an inner tube 51 and an outer tube 52 disposed on an outer side of the inner tube 51.

A catalyst 53 is housed on an inner side of the inner tube 51. The catalyst 53 is a three-way catalyst that removes hazardous components in the exhaust gas, such as hydrocarbon (HC), carbon monoxide (CO), and nitrogen oxides (NOx), through oxidation and reduction reaction, and has, for example, a honeycomb catalyst structure in which a porous honeycomb structure body is coated with catalyst components, such as platinum, palladium, and rhodium. Note that the structure is not limited to the honeycomb catalyst structure, but may be of a simple type, such as a plate catalyst structure in which catalyst components are carried on a plate material.

The configuration is made such that part of cooling water to be delivered to the V-type engine 10 is guided between the inner tube 51 and the outer tube 52.

That is, the V-type engine 10 includes a water jacket portion (not shown) of the cylinder block 14 for cooling the V-type engine 10. In the present embodiment, cooling water piping 54 communicating with the water jacket portion that forms a cooling mechanism is connected to the side of the crankshaft 13 of the water jacket portion. Each piece of cooling water piping 54 communicates with a space between the outer tube 52 and the inner tube 51.

As illustrated in FIG. 2, it is assumed that of the pieces of the cooling water piping 54, the cooling water piping 54 connected to a lower side of the catalyst holder 50 is the cooling water piping 54 for delivering cooling water to the catalyst holder 50 and the cooling water piping 54 connected to an upper side of the catalyst holder 50 is the cooling water piping 54 for returning the cooling water from the catalyst holder 50 to the V-type engine 10.

Further, as illustrated in FIG. 4, the cooling water piping 54 connected to the lower side is configured with two pieces of cooling water piping 54.

One piece of the cooling water piping 54 is connected to the catalyst holder 50 directly from the V-type engine 10, and the other piece of the cooling water piping 54 is provided midway with a cooling water supply device 55 that supplies cooling water to the catalyst holder 50. The cooling water supply device 55 is configured with, for example, a pump or the like that is driven by a motor.

The configuration is made such that in a normal state, cooling water is delivered to the catalyst holder 50 via the cooling water piping 54 without the cooling water supply device 55 interposed, while in a case where cooling water is in short supply, the cooling water supply device 55 is driven to deliver the cooling water to the catalyst holder 50 via the other cooling water piping 54.

A lower exhaust pipe 32 is connected to a lower side of the catalyst holder 50. The exhaust pipe of the present invention is configured with the exhaust pipe 31, the rear exhaust pipe 33, and the lower exhaust pipe 32.

A tip end portion of the lower exhaust pipe 32 communicates with an exhaust passage provided inside the casing 2. The exhaust passage communicates with water via a center portion of the screw (not shown).

Figure 5:
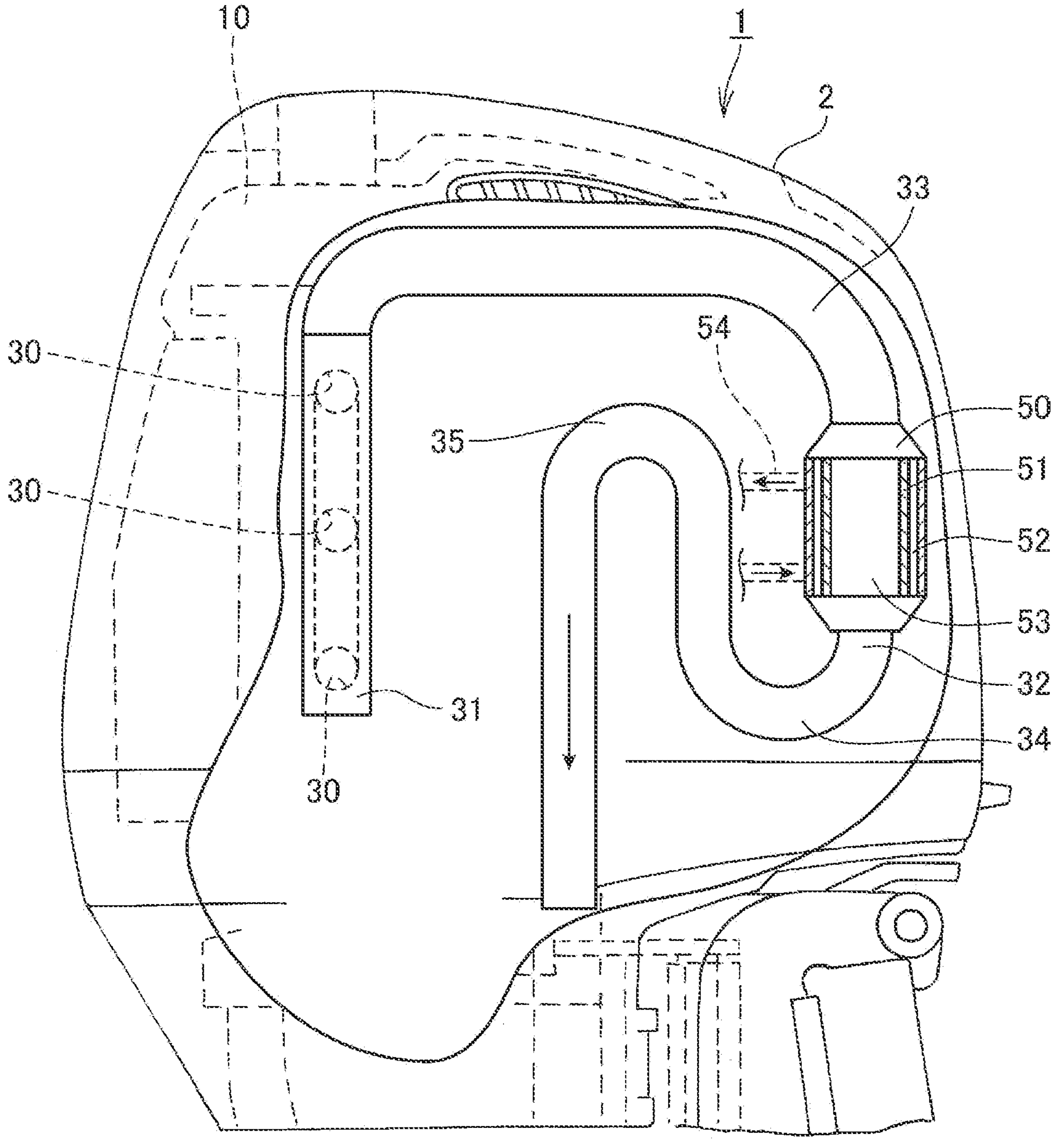
FIG. 5 is a schematic configurational view illustrating a modification of the exhaust structure of the V-type engine.

FIG. 5 is a schematic configurational view illustrating a modification of the exhaust structure of the V-type engine 10 showing a modification of the exhaust pipe.

As illustrated in FIG. 5, the lower exhaust pipe 32 on a downstream side of the catalyst holder 50 may include an upper side folded-back portion 34 formed in an upward curve on a downstream side of the catalyst 53 and a lower side folded-back portion 35 formed in a curve downward from the upper side folded-back portion 34.

With this configuration, water damage to the catalyst 53 due to a reverse flow of liquid from the water can be reduced.

Further, when the lower side folded-back portion 35 is above the catalyst 53, the waterproof effect increases. When the lower side folded-back portion 35 is on a further upper side, the waterproof effect can be further expected, but the exhaust pipe 31 takes up the unused site of the V-type engine 10, and therefore, how far the exhaust pipe 31 is extended upward only needs to be appropriately selected by setting designing conditions for the engine.

Furthermore, when the lower exhaust pipe 32 on the downstream side of the catalyst holder 50 is arranged on an engine mount and communicates with the exhaust passage provided inside the casing 2, the layout of the exhaust system can be realized without waste.

Next, the function of the present embodiment will be described.

In the present embodiment, the V-type engine 10 is driven, thereby transmitting the driving force of the V-type engine 10 to a screw shaft (not shown) via the crankshaft 13 to thus rotate the screw so as to move a watercraft forward or backward.

The exhaust gas discharged from the cylinder head 20 of the V-type engine 10 is delivered to the rear exhaust pipe 33 through the exhaust openings 30.

Then, the exhaust gas delivered to the rear exhaust pipe 33 of each bank merges to be delivered to the catalyst holder 50.

The hazardous components in the exhaust gas are removed in the catalyst holder 50 by the catalyst 53 through oxidation and reduction reaction, and are discharged into the water through a screw portion via the lower exhaust pipe 32.

Since the rear exhaust pipes 33 in the respective banks are merged and the catalyst holder 50 is provided in this merge portion, the exhaust gas from each bank can be purified by the single catalyst 53, so that the number of catalysts 53 installed is reduced to thus be able to reduce manufacturing cost.

In this case, in order to favorably perform oxidation and reduction reaction of the catalyst 53, the catalyst 53 needs to be maintained at a predetermined temperature. In the present embodiment, since cooling water is supplied between the inner tube 51 and the outer tube 52 of the catalyst holder 50 via the cooling water piping 54 by driving the cooling water supply device 55 so as to maintain the temperature of the catalyst holder 50 at a predetermined temperature, the temperature of the catalyst 53 can be adjusted to be a predetermined temperature.

Note that in the form of finished equipment, it is natural to select a cooling method, and for example, for a riding lawn mower or a riding snow blower, indirect cooling as in a passenger vehicle may be adopted, and for the outboard motor 1, a direct cooling method of directly taking in cooling water from water may be adopted. In addition, in the case of the outboard motor 1, when the cooling capacity is insufficient, the cooling capacity may be reinforced with a pump or the like that is driven by an electric motor, or indirect cooling for cooling the catalyst or further, a direct cooling system for cooling the catalyst may be separately provided.

As described above, in the present embodiment, the cylinders where the pistons 16 operate are arranged in a V-shape and the crankshaft 13 driven by the driving of the pistons 16 is disposed vertically, the exhaust pipes 31 communicating with the exhaust openings 30 in the respective banks of the cylinder head are included, the rear exhaust pipes 33 (exhaust pipes) in the respective banks are drawn toward the side of the crankshaft 13 to be merged, and the catalyst holder 50 that holds the catalyst 53 is provided in the merge portion of the rear exhaust pipes 33.

In this manner, since the rear exhaust pipes 33 in the respective banks are merged and the catalyst holder 50 is provided in this merge portion, the exhaust gas from each bank can be purified by the single catalyst 53, so that the number of catalysts 53 installed is reduced to thus be able to reduce manufacturing cost.

Further, in the present embodiment, the lower exhaust pipe 32 (exhaust pipe) on the downstream side of the catalyst holder 50 is connected to the exhaust passage of the casing.

In this manner, the exhaust gas passing the catalyst 53 via the lower exhaust pipe 32 can be discharged to the outside via the exhaust passage.

Further, in the present embodiment, the cooling water piping 54 where part of the cooling water to be delivered to the cylinder head is delivered is connected to the catalyst holder 50.

In this manner, by supplying the cooling water to the catalyst holder 50 via the cooling water piping 54, the temperature of the catalyst holder 50 can be adjusted to a predetermined temperature. Therefore, by maintaining the catalyst 53 at a predetermined temperature, oxidation and reduction reaction of the catalyst 53 can be favorably performed.

Further, in the present embodiment, part of the cooling water is supplied to the catalyst holder 50 via the cooling water piping 54 from the side of the crankshaft 13 of the water jacket portion of the cylinder block 14, and the cooling water is returned to the water jacket portion via the cooling water piping 54.

In this manner, part of the cooling water is supplied to the catalyst holder 50 via the cooling water piping 54 from the side of the crankshaft 13 of the water jacket portion of the cylinder block 14, and the cooling water is returned to the water jacket portion via the cooling water piping 54, which are also advantageous in terms of cost in that no specific modification is made to the basic engine structure and the structure is not particularly complicated.

Further, in the present embodiment, the cooling water piping 54 is provided with the cooling water supply device 55 that supplies cooling water to be delivered to the cylinder block 14 to the catalyst holder 50.

In this manner, even when the cooling water is in short supply, for example, upon start-up of the V-type engine 10, the cooling water can be forcibly supplied to the catalyst holder 50 by means of the cooling water supply device 55. Therefore, the temperature of the catalyst holder 50 can be adjusted to a moderate temperature with the cooling water, and by maintaining the catalyst 53 at a predetermined temperature, oxidation and reduction reaction of the catalyst 53 can be favorably performed.

Modification

Figure 6:
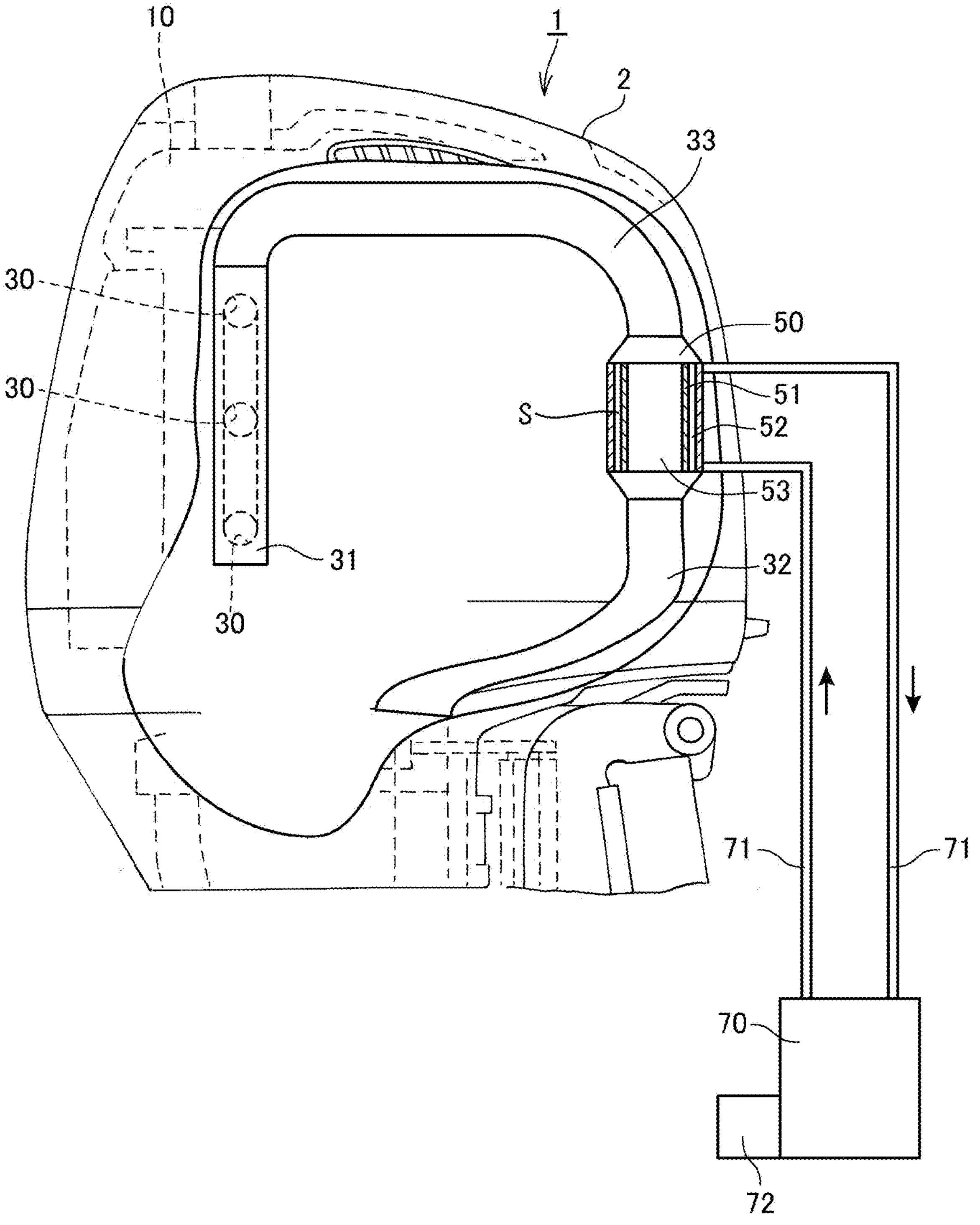
FIG. 6 is a schematic configurational view illustrating a modification of the exhaust structure of the V-type engine.

FIG. 6 is a schematic configurational view illustrating a modification of the exhaust structure of the V-type engine 10.

For example, as illustrated in FIG. 6, the catalyst holder 50 may be provided with a radiator 70 that is an example of a cooling mechanism that cools and circulates the cooling water via pieces of external piping 71 in pair.

Specifically, the radiator 70 is a cooling mechanism composed of a cooling fan and a heat exchanger. The radiator 70 cools the cooling water flown into the heat exchanger by means of the cooling fan. The radiator 70 may be attached to an outer side of the casing 2 of the outboard motor 1. Further, without limiting to this, the radiator 70 may be attached to a watercraft to which the outboard motor 1 is attached.

The radiator 70 is provided with an external pump 72. The external pump 72, which corresponds to an example of a pump device, circulates the cooling water between the catalyst holder 50 and the radiator 70.

The cooling water delivered by means of the external pump 72 passes from the radiator 70 through one piece of the external piping 71 to flow into a space S between the outer tube 52 and the inner tube 51 so as to cool the catalyst 53, and then returns to the radiator 70 through the other piece of the external piping 71.

In this manner, it is possible to more surely adjust the temperature of the catalyst 53 while restricting a layout change inside the outboard motor 1.

Figure 7:
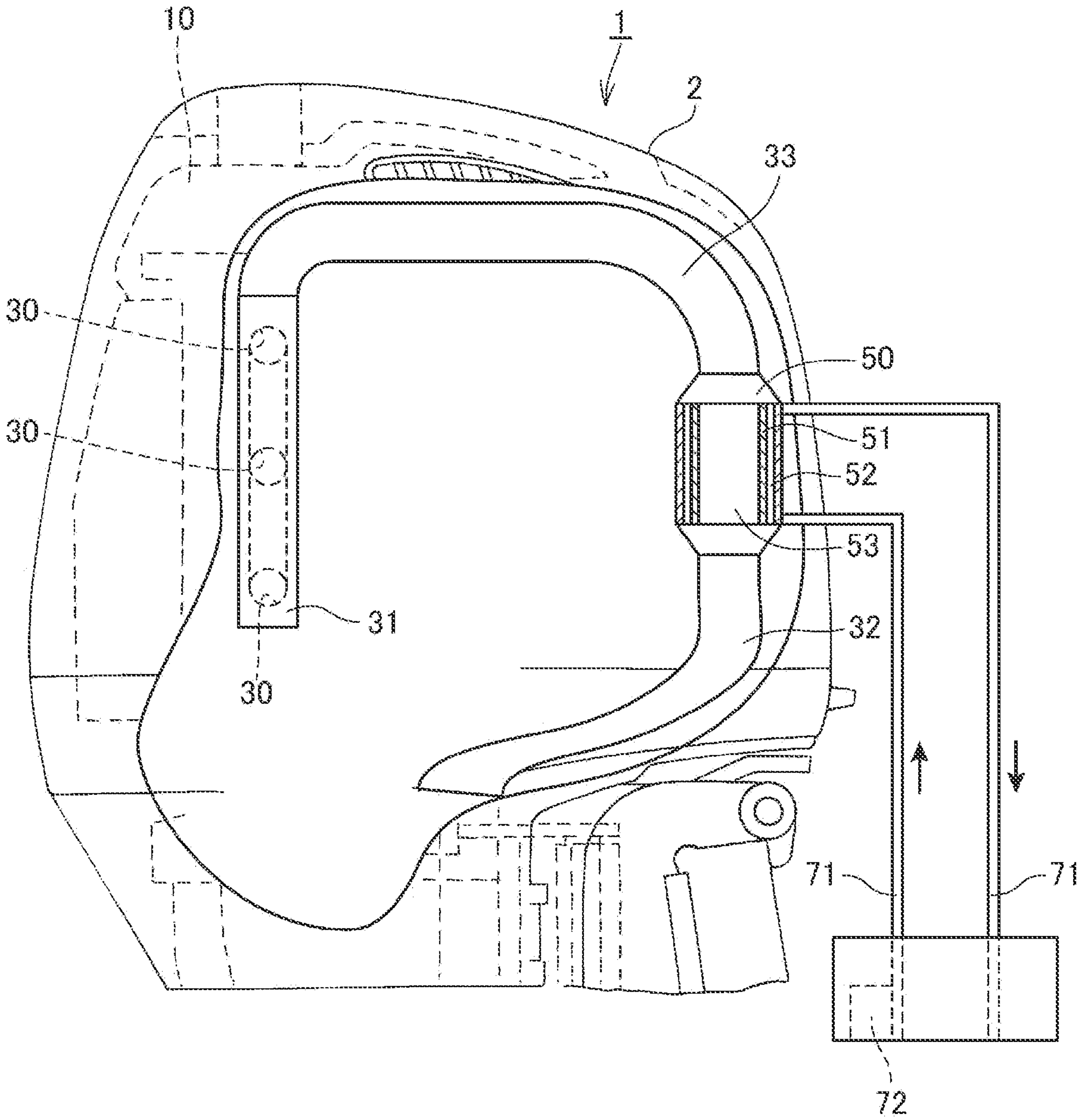
FIG. 7 is a schematic configurational view illustrating another modification of the exhaust structure of the V-type engine.

FIG. 7 is a schematic configurational view illustrating another modification of the exhaust structure of the V-type engine 10.

For example, as illustrated in FIG. 7, the pieces of the external piping 71 in pair are connected to the catalyst holder 50, and the external piping 71 may be provided with the external pump 72.

Lower end portions of the pieces of the external piping 71 and the external pump 72 are fixed to the watercraft in which the outboard motor 1 is installed.

The lower end portion of the external piping 71 on a side for delivery to the catalyst holder 50 is positioned in the water below the watercraft.

Further, the configuration is made such that by driving the external pump 72, fresh water or seawater underwater is taken in through the external piping 71 to be delivered to the catalyst holder 50. The cooling water after cooling the catalyst holder 50 is released into the water via the external piping 71.

In this manner, it is possible to more surely adjust the temperature of the catalyst 53 while restricting a layout change inside the outboard motor 1.

Note that in the aforementioned embodiment, the present invention has been described, but the present invention is not limited to the aforementioned embodiment, and change, substitution, addition, omission, and the like in various ways are available as needed.

Further, the present invention does not limit the finished equipment as long as it is the V-type engine 10 in which the crankshaft 13 is disposed vertically, and is applicable to, for example, a riding lawn mower, a grass mower, a riding snow blower, or an outdoor motor.

Configurations Supported by the Aforementioned Embodiment

The aforementioned embodiment supports the following configurations.

(Configuration 1) A V-type engine in which cylinders where pistons operate are arranged in a V-shape and a crankshaft driven by driving of the pistons is disposed vertically, the V-type engine including: exhaust pipes communicating with exhaust openings in respective banks of a cylinder head, wherein the exhaust pipes in the respective banks are merged outside on a side of the crankshaft, and a catalyst holder that holds a catalyst is provided in a merge portion of the exhaust pipes.

According to this configuration, since the exhaust pipes in the respective banks are merged and the catalyst holder is provided in this merge portion, exhaust gas from each bank can be purified by a single catalyst, so that the number of catalysts installed is reduced to thus be able to reduce manufacturing cost.

(Configuration 2) The V-type engine according to Configuration 1, wherein the exhaust pipes communicating with the exhaust openings in the respective banks of the cylinder head extend from upper portions of the exhaust openings at a highest in the respective banks through upper portions of the cylinder block 14 and a crankcase and merge outside on the side of the crankshaft.

According to this configuration, by arranging the exhaust pipes, an unused space on an outer side of the banks of the V-type engine can be effectively used as an arrangement space for auxiliary equipment, a cable, or an exhaust pipe for a waterproof measure.

(Configuration 3) The V-type engine according to Configuration 1, wherein the exhaust pipe on a downstream side of the catalyst holder is connected to an exhaust passage of a casing.

According to this configuration, the exhaust gas passing the catalyst via the exhaust pipe can be discharged to the outside via the exhaust passage.

(Configuration 4) The V-type engine according to Configuration 1, wherein the exhaust pipe on a downstream side of the catalyst holder includes an upper side folded-back portion formed in an upward curve on a downstream side of the catalyst and a lower side folded-back portion formed in a curve downward from the upper side folded-back portion.

According to this configuration, water damage to the catalyst due to a reverse flow of liquid from the water can be reduced.

(Configuration 5) The V-type engine according to Configuration 1, wherein the catalyst holder includes a cooling mechanism.

According to this configuration, the catalyst holder includes the cooling mechanism, so that the temperature of the catalyst holder can be adjusted to a moderate temperature. Therefore, by maintaining the catalyst at a predetermined temperature, oxidation and reduction reaction of the catalyst can be favorably performed.

(Configuration 6) The V-type engine according to Configuration 5, wherein the cooling mechanism supplies part of cooling water to the catalyst holder via cooling water piping from the side of the crankshaft of a water jacket portion of the cylinder block, and returns the cooling water to the water jacket portion via the cooling water piping.

According to this configuration, the cooling mechanism supplies part of the cooling water to the catalyst holder via the cooling water piping from the side of the crankshaft of the water jacket portion of the cylinder block, and returns the cooling water to the water jacket portion via the cooling water piping, which are also advantageous in terms of cost in that no specific modification is made to the basic engine structure and the structure is not particularly complicated.

(Configuration 7) The V-type engine according to Configuration 6, wherein the cooling water piping is provided with a cooling water supply device that supplies cooling water to be delivered to the cylinder block to the catalyst holder.

According to this configuration, even when the cooling water is in short supply, for example, upon start-up of the V-type engine, the cooling water can be forcibly supplied to the catalyst holder by means of the cooling water supply device. Therefore, the temperature of the catalyst holder can be adjusted to a predetermined temperature with the cooling water, and by maintaining the catalyst at a predetermined temperature, oxidation and reduction reaction of the catalyst can be favorably performed.

(Configuration 8) The V-type engine according to Configuration 7, wherein the cooling water supply device operates upon start-up of an engine or as a catalyst temperature adjuster.

According to this configuration, in a case where the cooling capacity of the V-type engine is insufficient, when operating upon start-up of the V-type engine or as a catalyst temperature adjuster, the cooling water supply device can contribute to exhibiting the capacity of the catalyst and the durability.

(Configuration 9) The V-type engine according to Configuration 5, wherein the cooling mechanism separately retains a cooling unit and cools the catalyst holder. According to this configuration, for the cooling mechanism, it is preferable to provide a cooling unit with a radiator, for example, which can more properly control the temperature adjustment of the catalyst to thus contribute to exhibiting the capacity of the catalyst and the durability.

(Configuration 10) The V-type engine according to Configuration 5, wherein the cooling mechanism separately supplies cooling water from water to the catalyst holder and releases the cooling water into the water from the catalyst holder.

According to this configuration, the cooling mechanism only needs to have a structure for supply and release of cooling water that separately supplies cooling water from water to the catalyst holder and releases the cooling water into the water from the catalyst holder, and exhibits sufficient effects only with the addition of simple equipment.

(Configuration 11) An outboard motor, including the V-type engine according to any one of Configuration 1 to Configuration 10.

According to this configuration, an outboard motor can be obtained in which exhaust gas from each bank can be purified by a single catalyst, so that the number of catalysts installed is reduced to thus be able to reduce manufacturing cost.

(Configuration 12) A watercraft, including the outboard motor according to Configuration 11.

According to this configuration, a watercraft can be obtained that uses the outboard motor in which exhaust gas from each bank can be purified by a single catalyst, so that the number of catalysts installed is reduced to thus be able to reduce manufacturing cost.

REFERENCE SIGNS LIST

1 outboard motor
2 casing
10 V-type engine
11 crank chamber
12 crankcase
13 crankshaft
14 cylinder block
15 cylinder
16 piston
17 connecting rod
18 drive sprocket
20 cylinder head
21 combustion chamber
22 intake valve
23 intake port
24 exhaust valve
25 exhaust port
26 camshaft
27 cam
28 cam sprocket
29 timing belt
30 exhaust opening
31 exhaust pipe
32 lower exhaust pipe
33 rear exhaust pipe
34 upper side folded-back portion
35 lower side folded-back portion
50 catalyst holder
51 inner tube
52 outer tube
53 catalyst
54 cooling water piping
55 cooling water supply device

The invention claimed is:

1. A V-type engine in which cylinders where pistons operate are arranged in a V-shape and a crankshaft driven by driving of the pistons is disposed vertically, the V-type engine comprising:

exhaust pipes communicating with exhaust openings in respective banks of a cylinder head, wherein the exhaust pipes in the respective banks are merged outside on a side of the crankshaft, of a cylinder block, a catalyst holder that holds a catalyst is provided in a merge portion of the exhaust pipes, the catalyst is disposed at a lateral side of the cylinder block, a plurality of pieces of cooling water piping supplies a part of a cooling water to the catalyst holder from a water jacket portion of the cylinder block at the side of the crankshaft, and that returns the part of the cooling water from the catalyst holder to the water jacket portion, among the plurality of pieces of cooling water piping, cooling water piping connected to a lower side of the catalyst holder delivers the part of the cooling water to the catalyst holder and cooling water piping connected to an upper side of the catalyst holder returns the part of the cooling water from the catalyst holder to the water jacket portion, the exhaust pipe on a downstream side of the catalyst holder comprises an upper side folded-back portion formed in an upward curve on a downstream side of the catalyst and a lower side folded-back portion formed in a curve downward from the upper side folded-back portion, the lower side folded-back portion is disposed above the cooling water piping connected to the upper side of the catalyst holder, wherein the cooling water piping connected to the lower side of the catalyst holder includes two pieces of the cooling water piping, a first piece of the two pieces of the cooling water piping is connected to the catalyst holder directly from the water jacket portion, and a second piece of the two pieces of the cooling water piping is provided midway with a pump.

2. The V-type engine according to claim 1, wherein the exhaust pipes communicating with the exhaust openings in the respective banks of the cylinder head extend from upper portions of a highest one of the exhaust openings in the respective banks through upper portions of the cylinder block and a crankcase and merge outside on the side of the crankshaft.

3. The V-type engine according to claim 1, wherein the exhaust pipe on a downstream side of the catalyst holder is connected to an exhaust passage of a casing.

4. The V-type engine according to claim 1, wherein the exhaust pipes of the respective banks are merged outside on the side of the crankshaft, of the cylinder block so that the exhaust pipes of the respective banks face each other.

5. An outboard motor, comprising the V-type engine according to claim 1.

6. A watercraft, comprising the outboard motor according to claim 5.

* * * * *